Patented Aug. 6, 1929.

1,723,791

UNITED STATES PATENT OFFICE.

WLADIMIR KYBER, OF BERLIN-STEGLITZ, GERMANY.

PROCESS FOR THE PRODUCTION OF PHOSPHORUS AND FUSION CEMENT FROM NATURAL PHOSPHATES.

No Drawing. Application filed July 16, 1926, Serial No. 123,008, and in Germany August 4, 1925.

The invention relates to a process for extracting phosphorus from natural phosphates in a more rational, and at the same time more economically practicable manner, and for obtaining it in a suitable form.

Wohler has made known the reaction for extracting phosphorus from natural phosphates by heating the latter with carbon and silicic acid. On this heating of the natural phosphate with carbon and silicic acid, a tri-silicate dross was left, which melted at a moderately high temperature, and which had no industrial value. The process is uneconomical, in so far that a high temperature is necessary for fusion, and no useful by-product results. Moreover, this process does not give a good yield of phosphorus.

It has also already been proposed to extract the phosphorus from calcium or aluminum phosphates without adding carbon, by mixing the phosphates with clay and melting them in an electric furnace having an arc temperature of about 3000° C. (see American Patent No. 1,076,497). This process also is uneconomical because of the great expenditure of heat energy.

Again, it has further been proposed to obtain phosphorus in the form of phosphoric acid by sintering a mixture of natural phosphate of calcium and aluminium phosphate without the addition of carbon, and thereby obtaining together with the phosphorus a cementitious product in the nature of an aluminium-containing Portland cement. Since in this process calcination is accompanied by oxidation, the phosphorus is obtained in the form of its oxide. (See American Patent No. 1,000,311). This process is uneconomical on account of the necessarily high temperatures required.

Finally, it has been proposed to extract the phosphorus from natural calcium phosphate, silicates and silicic-acid containing clay at a comparatively low temperature of about 1400° C. in the form of phosphorus pentoxide, by calcining such a mixture. Here the condition of a low temperature of fusion is fulfilled, but the resultant dross is of less value and has at most the value of a Pozzolana cement. (See American Patent No. 997,086).

The process of the present invention differs from the processes described above in that it is effected with the use of carbon as in the first-mentioned process of Wohler, and by the increase of the quantity of alumina in the dross at the expense of lime and silicic acid, it not only makes a low temperature of fusion possible, but also produces simultaneously a valuable fusion cement as dross. The quantity of alumina in the dross must be at least 27%, and the charge must be proportioned correspondingly.

The process will be further illustrated by two examples.

*Example 1.*

One ton pebble, 0.6 ton bauxite, and 1.5 tons of coke are smelted together. A fusion cement of the following composition results: $CaO = 42.5\%$ : $Al_2O_3 = 41.0\%$ : $SiO_2 = 16.5\%$.

*Example 2.*

One ton pebble phosphate to 1 ton natural aluminium phosphate, ⅓ ton bauxite, and 3 tons coke. The material is crushed or if necessary ground and formed into briquettes and melted for reduction purposes in a blast furnace. A fusion cement is produced of approximately the following composition:

$CaO = 43.5\%$ : $Al_2O_3 = 40.5\%$ : $SiO_2 = 16\%$.

A phosphorus-containing iron regulus also results, and an elementary phosphorus-containing gas.

With this carrying out of the process, cements of a high alumina content, result as dross, which cements are known technically as fusion cements. The high quantity of alumina can be secured, as will be seen from the examples, either by the addition of bauxite or by the employment of an aluminium-phosphate together with calcium phosphate. It is possible, moreover, if aluminium-phosphate only is used and calcium phosphate is not available, to constitute the charge so that the lime necessary for the making of the cement is added in the form of carbonate of lime.

The present process can, however, be so carried out, that instead of phosphoric acid, alkali phosphate is obtained directly from the process. For this purpose the charge for the furnace is so constituted that it contains alkali compounds. As alkali compounds there are available feldspar and cryolite, or any other suitable compound of potash or soda may be employed. It is, in this case, of no importance with which of the two above-described forms of carrying out the process one starts, whether from calcium phosphates with addition of aluminum compounds, or from aluminium phosphates with addition of lime compounds. In any case, the additions of the alkali compounds influence the molten mass very favourably, and at the temperature of fusion the alkalis become volatilized with the phosporus and combine with it under the influence of the carbonic acid into alkali phosphates, which are thus obtained in the same process with the fusion cement. The phosphorus is obtained in large quantities in the form of phosphates. According to the form of carrying out the process as described above, it is possible to work in a blast furnace or shaft furnace in such a manner that the generator gas produced is retained. Thereby the heat of the fuel is most economically utilized.

The process will be illustrated by an example with accompanying figures.

It should be observed that for the sake of simplicity that ashes content of the coke is left out of consideration in the figures given, and that it is further assumed that all the iron of the charge is combined with phosphorus and passes over in the regulus as phosphite of iron. As crude material will be taken a pebble phosphate of the composition:

$CaO=46\%$: $Al_2O_3=2.5\%$: $Fe_2O_3=1.5\%$:
$SiO_2=7\%$: $CO_2=3\%$: $P_2O_5=34\%$:

Indefinite matter and water$=6\%$, together with a bauxite of the composition, $Al_2O_3=65\%$: $SiO_2=10\%$: $H_2O=15\%$:
$Fe_2O_3=10\%$, and a normal feldspar.

A ton of the phosphate is then mixed with 0.6 ton bauxite and 1.05 tons feldspar, and this mixture is smelted down in a blast furnace or shortened generator furnace, with the addition of the quantity of coke necessary for the heating. A dross of approximately the following composition is obtained:

$CaO=40\%$: $Al_2O_3=40\%$: $SiO_2=20\%$.

In this case the proportion of potassium oxide to phosphorus pentoxide is about 8%. This proportion is not essentially increased by the addition of feldspar. It is possible with the process to start from silicates of aluminum. There is then the advantage of carrying it out without the addition of bauxite, but in this case carbonate of lime must be added as a corrective. According as a high proportion of potassium to phosphorus pentoxide is desired, feldspar or chloride of potassium may be added to the mixture.

I claim:

1. The process for treating phosphates and recovering by-products which comprises smelting together natural calcium phosphate, aluminium phosphate and carbon in such proportions that the dross contains at least 27% aluminium oxide.

2. The process for treating phosphates and recovering by-products which comprises smelting a mixture including natural calcium phosphate, aluminous material and carbon in such proportions that the dross contains at least 27% aluminium oxide.

3. The process for treating phosphates and recovering by-products which comprises smelting a mixture including natural calcium phosphate, bauxite and carbon in such proportions that the dross contains at least 27% aluminium oxide.

4. The process for treating phosphates and recovering by-products which comprises smelting a mixture including natural aluminium phosphate, a compound of calcium, and carbon in such proportions that the dross contains at least 27% aluminium oxide.

5. The process for treating phosphates and recovering by-products which comprises smelting a mixture of natural calcium phosphate, aluminium phosphate, coke and alkali compound in such proportions that the escaping phosphorus oxide combines with evaporated alkali and the resultant dross contains at least 27% aluminium oxide.

6. The process for treating phosphates and recovering by-products which comprises smelting a mixture of natural calcium phosphate, a compound of aluminium, an alkali compound and coke in such proportions that the escaping phosphorus oxide combines with evaporated alkali and the resultant dross contains at least 27% aluminium oxide.

7. The process for treating phosphates and recovering by-products which comprises smelting a mixture of natural phosphate, bauxite, an alkali compound, and coke in such proportions that the escaping phosphorus oxide combines with evaporated alkali and the resultant dross contains at least 27% aluminium oxide.

8. The process for treating phosphates and recovering by-products which comprises smelting a mixture including natural calcium phosphate, feldspar, an aluminum compound other than feldspar, and coke in such proportions that the escaping phosphorus oxide combines with evaporated alkali and the resultant dross contains at least 27% aluminium oxide.

9. The process for treating alkali phosphates and recovering by-products which comprises smelting a mixture including natural aluminum phosphate, a compound of calcium, an alkali compound and carbon in such proportions that the escaping phosphorus oxide combines with evaporated alkali and the dross contains at least 27% aluminium oxide.

WLADIMIR KYBER.